(12) United States Patent
Honaker et al.

(10) Patent No.: US 11,821,054 B2
(45) Date of Patent: Nov. 21, 2023

(54) METHOD FOR RECOVERING VALUABLE ELEMENTS FROM PRECOMBUSTION COAL-BASED MATERIALS

(71) Applicant: University of Kentucky Research Foundation, Lexington, KY (US)

(72) Inventors: Rick Honaker, Lexington, KY (US); Wencai Zhang, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 909 days.

(21) Appl. No.: 16/832,157

(22) Filed: Mar. 27, 2020

(65) Prior Publication Data

US 2020/0308667 A1   Oct. 1, 2020

Related U.S. Application Data

(60) Provisional application No. 62/827,361, filed on Apr. 1, 2019.

(51) Int. Cl.
| | |
|---|---|
| *C22B 1/00* | (2006.01) |
| *C22B 1/02* | (2006.01) |
| *C22B 1/24* | (2006.01) |
| *C22B 3/44* | (2006.01) |
| *C22B 3/04* | (2006.01) |
| *C22B 59/00* | (2006.01) |
| *C22B 3/22* | (2006.01) |

(52) U.S. Cl.
CPC .................. *C22B 1/02* (2013.01); *C22B 1/24* (2013.01); *C22B 3/04* (2013.01); *C22B 3/22* (2013.01); *C22B 3/44* (2013.01); *C22B 59/00* (2013.01)

(58) Field of Classification Search
CPC ........... C22B 59/00; C22B 3/22; C22B 3/165; C22B 3/44; C22B 3/04; C22B 3/06; C22B 1/02; C22B 1/24; C01F 17/10; C01F 17/17
See application file for complete search history.

(56) References Cited

PUBLICATIONS

Lin et al "Application of sequential extraction and hydrothermal treatment . . . " Fuel, 332, (2018), pp. 124-133. (Year: 2018).*
Kumari et al; "Process Development to Recover Rare Earth Metals from Monazite Mineral: A Review"; Minerals Engineering 79 (2015); pp. 102-115.
Kumari et al; "Thermal Treatment for the Separation of Phosphate and Recovery of Rare Earth Metals (REMs) from Korean Monazite"; Journal of Industrial and Engineering Chemistry 21 (2015); pp. 696-703.
Zhang et al; "Characterization and Recovery of Rare Earth Elements and Other Critical Metals (Co, Cr, Li, Mn, Sr, and V) from the Calcination Products of a Coal Refuse Sample"; Fuel 267 (2020) 117236; pp. 1-12.
Zhang et al; "Lithium Leaching Recovery and Mechanisms from Density Fractions of an Illinois Basin Bituminous Coal"; Fuel 268 (2020) 117319; pp. 1-11.
Zhang et al; "Enhanced Leachability of Rare Earth Elements from Calcined Products of Bituminous Coals"; Minerals Engineering 142 (2019) 105935; pp. 1-9.
Zhang et al; "Calcinatin Pretreatment Effects on Acid Leaching Characteristics of Rare Earth Elements from Middlings and Coarse Refuse Material Associated with a Bituminous Coal Source"; Fuel 249 (2019); pp. 130-145.
Bian et al; "Kinetics of Mixed Rare Earths Minerals Decomposed by CaO with NaCl—CaCl2 Melting Salt"; Science Direct, Journal of Rare Earths; vol. 28; Spec. Issue, Dec. 2010; p. 86.
Sun et al; "Influence of NaCl—CaCl2 on Decomposing REPO4 with CaO"; Science Direct, Journal of Rare Earths 25 (2007) pp. 779-782.
Xing et al; "High Temperature Dephosphorization Behavior of Monazite Concentrate with Charred Coal"; Science Direct, Transactions of Nonferrous Metals Society of China 20 (2010); pp. 2392-2396.
Burmaa et al; "Effect of Pretreatment of Synchysite-Ce (CaCe(CO3)2F) Leaching"; Science Direct; Minerals Engineering 20 (2007); pp. 807-809.
Zhu et al; "Chlorination Kinetics of Fluorine-Fixed Rare Earth Concentrate"; Science Direct; Minerals Engineering 16 (2003); pp. 671-674.
Wu et al; "Reaction Process of Monazite and Bastnaesite Mixed Rare Earth Minerals Calcined by CaO—NaCl—CaCl2"; Science Direct; Transactions of Nonferrous Metals Society of China 17 (2007); pp. 864-868.
Burgess et al; "Effect of Pre-reaction Ball Milling on Kinetics of Lanthanum Phosphate Roasting with Sodium Carbonate"; Ind. Eng. Chem. Res. 57 (2018); pp. 6088-6096.
Shuai et al; Kinetics of Roasting Decomposition of the Rare Earth Elements by CaO and Coal; Metals, 2017, 7, 213; pp. 1-14.
Zhang et al; "Occurrence and Distribution of Gallium, Scandium and Rare Earth Elements in Coal Gangue Collected from Junggar Basin, China"; International Journal of Coal Preparation and Utilization; ISSN: 1939-2699 (Print).
Peiravi et al; "Chemical Extraction of Rare Earth Elements form Coal Ash"; Society for Mining, Metallurgy & Exploration Inc; Minerals & Metallurgical Processing (2017); vol. 34, No. 4; pp. 170-177.
Huang et al; "Leaching Kinetics of Rare Earth Elements and Fluoride from Mixed Rare Earth Concentrate After Roasting with Calcium Hydroxide and Sodium Hydroxide"; Science Direct; Hydrometallurgy 173 (2017); pp. 15-21.

(Continued)

*Primary Examiner* — Steven J Bos
(74) *Attorney, Agent, or Firm* — Stites & Harbison PLLC; Warren D. Schickli

(57) ABSTRACT

A method for recovering valuable elements from pre-combustion coal-based materials includes the steps of grinding the materials to a predetermined size, roasting the ground materials at a temperature of 600° C.-700° C. for a predetermined residence time needed for mineral decomposition, submerging the roasted, ground materials in a solution of lixiviant, filtering the lixiviant solution to separate residual solids from a pregnant leach solution including the valuable elements and recovering and concentrating the valuable elements from the pregnant leach solution.

20 Claims, 15 Drawing Sheets

(56) References Cited

PUBLICATIONS

Kim et al; "Mechanochemical Decomposition of Monazite to Assist the Extraction of Rare Earth Elements"; Science Direct; Journal of Alloys and Compounds 486 (2009); pp. 610-614.
Sadri et al; "A Review on the Cracking, Baking and Leaching Processes of Rare Earth Element Concentrates"; Science Direct; Journal of Rare Earths 35, 8 (2017); pp. 739-752.
Wenyuan et al; "Study on Roasting Decomposition of Mixed Rare Earth Concentrate in CaO—NaCl—CaCl2"; Journal of Rare Earths 24; Spec Issue, Dec. 2006, pp. 23-27.

* cited by examiner

- Grinding the pre-combustion coal-based materials to a predetermined size — 12
- Roasting the ground pre-combustion coal-based materials at a temperature of between 600°C - 700°C for a predetermined residence time needed for mineral decomposition — 14
- Submerging the roasted pre-combustion coal-based materials in a solution of a lixiviant — 16
- Filtering the lixiviant solution to separate residual solids from a pregnant leach solution — 18
- Recovering and concentrating the valuable elements from the pregnant leach solution — 20

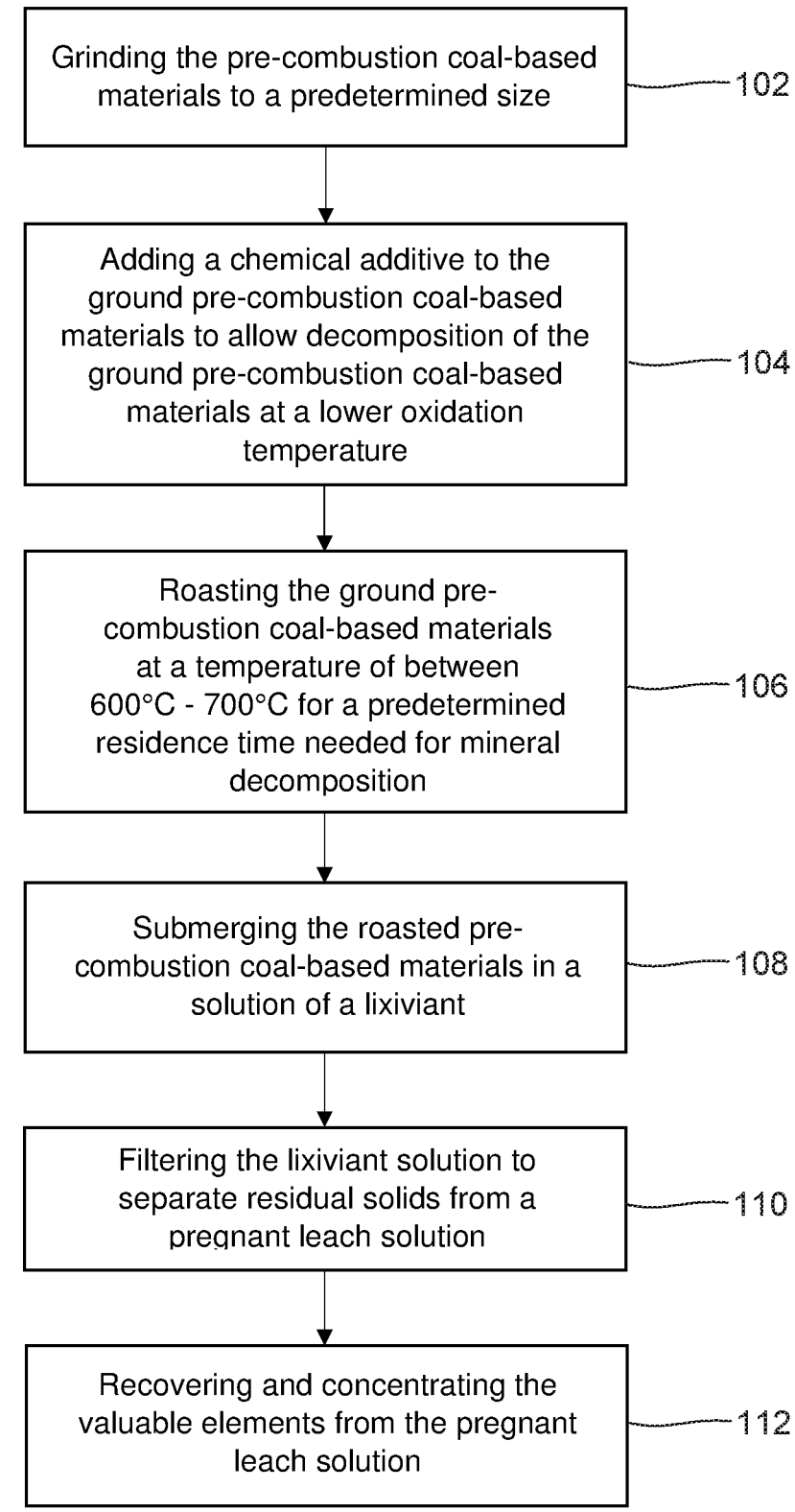

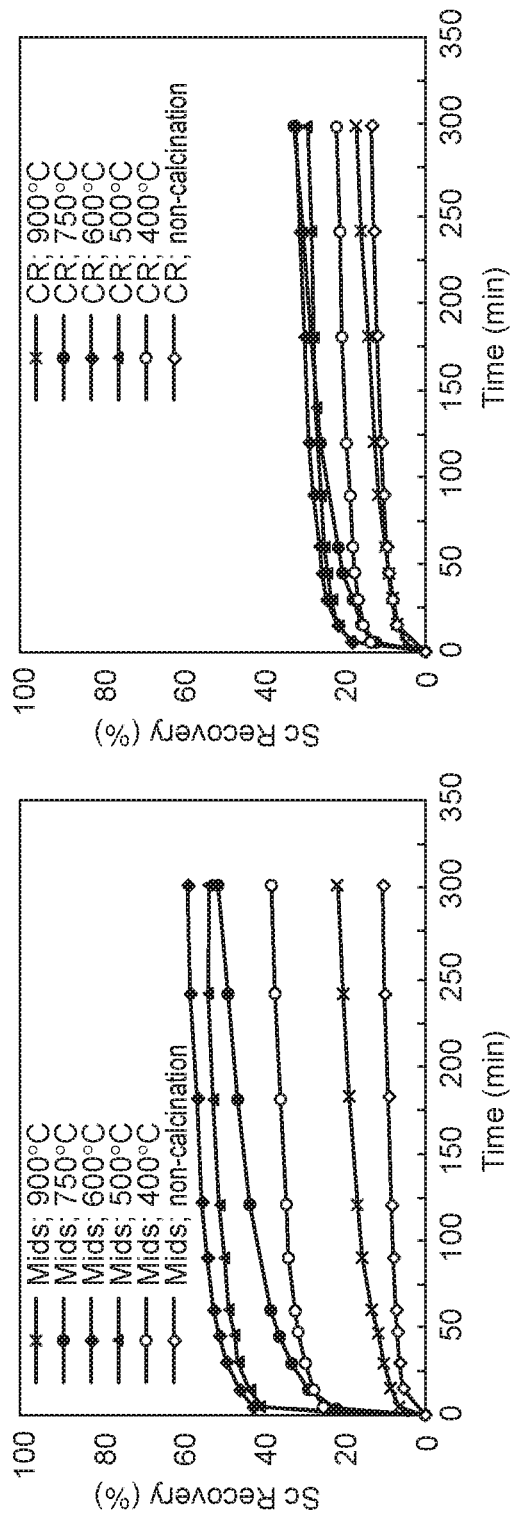
FIG. 6A
FIG. 6C
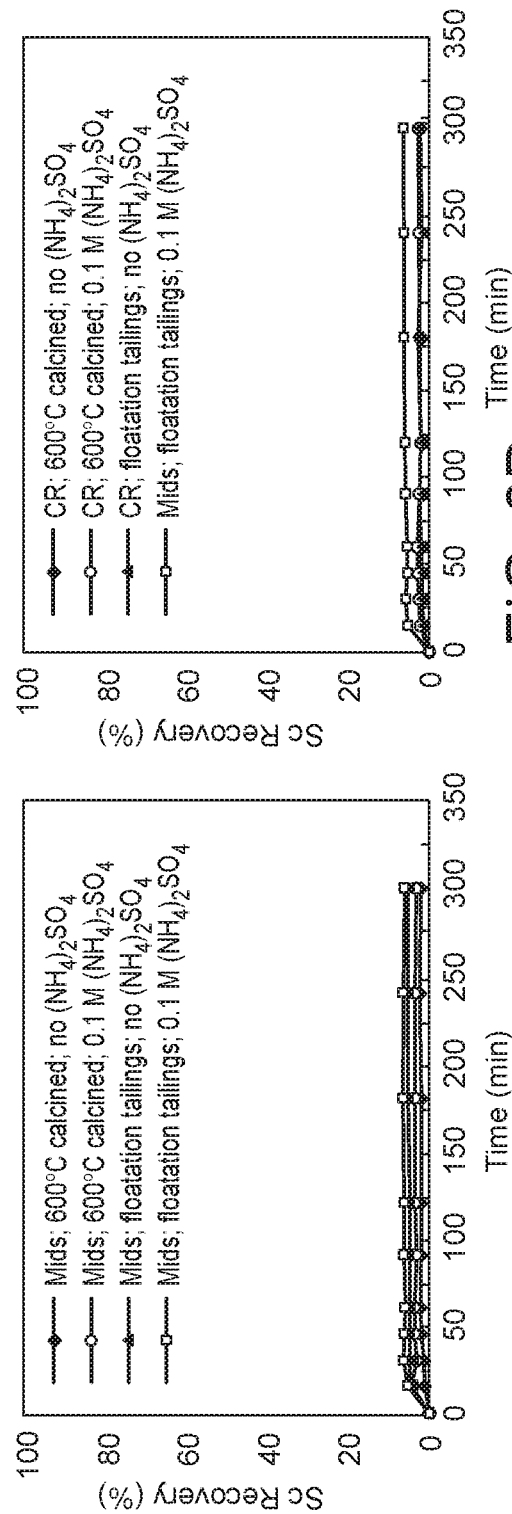
FIG. 6B
FIG. 6D

METHOD FOR RECOVERING VALUABLE ELEMENTS FROM PRECOMBUSTION COAL-BASED MATERIALS

RELATED APPLICATION

This application claims priority to U.S. Provisional Patent Application Ser. No. 62/827,361 filed on Apr. 1, 2019 which is hereby incorporated by reference in its entirety.

GOVERNMENT SUPPORT

This invention was made with government support under Grant No. DE-FE0031525 awarded by the Department of Energy. The government has certain rights in the invention.

TECHNICAL FIELD

This document relates generally to the field of enhanced recovery of valuable elements, such as rare earth elements, from pre-combustion coal-based materials.

BACKGROUND

It is increasingly important to recover valuable elements from alternative and secondary resources. For purposes of this document, "valuable elements" include rare earth elements (REEs), cerium (Ce), dysprosium (Dy), erbium (Er), europium (Eu), gadolinium (Gd), holmium (Ho), lanthanum (La), lutetium (Lu), neodymium (Nd), praseodynium (Pr), promethium (Pm), samarium (Sm), scandium (Sc), terbium (Tb), thulium (Tm), ytterbium (Yb) and yttrium (Y), as well as other elements including cobalt (Co), gallium (Ga), indium (In), tellurium (Te), lithium (Li), germanium (Ge) and vanadium (V).

These valuable elements are very useful for various important applications including, but not necessarily limited to the production of rechargeable batteries, cell phones, catalytic converters, magnets, computer memory devices, fluorescent lighting devices, as well as in other electronic applications.

This document relates to a new and improved method for recovering these valuable minerals from pre-combustion coal-based materials. For purposes of this document, "pre-combustion coal-based materials" include (a) run-of-mine material extracted from a coal seam, (b) associated mineral matter material within and immediately surrounding (roof and floor) a coal seam, (c) waste material generated during the mining process, (d) clean coal products produced in the process of upgrading coal in a processing plant or unit operation, (e) mixed-phase coal material, commonly referred to as 'middlings', (f) coarse coal waste from an active processing facility, (g) fine coal waste from an active processing facility, (h) coarse coal waste from legacy waste storage areas and (i) fine coal waste from a slurry impoundment, slurry cell, slurry pond or other fine waste storage facility.

SUMMARY

In accordance with the purposes and benefits described herein, a new and improved method is provided for the recovery of valuable elements from pre-combustion coal-based materials. That method includes the steps of: (a) grinding the pre-combustion coal-based materials to a predetermined size, (b) roasting the ground pre-combustion coal-based materials at a temperature of between 600° C.-700° C. for a predetermined residence time needed for mineral decomposition, (c) submerging the roasted pre-combustion coal-based materials in a solution of a lixiviant, (d) filtering the lixiviant solution to separate residual solids from a pregnant leach solution including the valuable elements and (e) recovering and concentrating the valuable elements from the pregnant leach solution.

In at least one of the many possible embodiments of the method, the method includes the additional step of using a lixiviant selected from a group of lixiviants consisting of ammonium sulfate, sulfuric acid, nitric acid, hydrochloric acid, mineral acid, organic acid, carboxyl acid and combinations thereof.

In at least one of the many possible embodiments of the method, the method includes the additional step of using as the pre-combustion coal-based material a material selected from a group consisting of (a) run-of-mine material extracted from a coal seam, (b) associated mineral matter material within and immediately surrounding (roof and floor) a coal seam, (c) waste material generated during the mining process, (d) clean coal products produced in the process of upgrading coal in a processing plant or unit operation, (e) mixed-phase coal material, commonly referred to as 'middlings', (f) coarse coal waste from an active processing facility, (g) fine coal waste from an active processing facility, (h) coarse coal waste from legacy waste storage areas, (i) fine coal waste from a slurry impoundment, slurry cell, slurry pond or other fine waste storage facility and combinations thereof.

In at least one of the many possible embodiments of the method, the recovering and concentrating step includes selectively precipitating the valuable elements. In at least one of the many possible embodiments of the method, the recovering and concentrating step includes solvent extracting the valuable elements. In at least one of the many possible embodiments of the method, the recovering and concentrating step includes selectively precipitating and solvent extracting the valuable elements.

All of these additional steps may be incorporated alone or in combination into the method.

In accordance with an additional aspect, the method for recovering valuable elements from pre-combustion coal-based materials, comprises the steps of: (a) grinding the pre-combustion coal-based materials to a predetermined size, (b) adding a chemical additive to the ground pre-combustion coal-based materials to allow decomposition of the ground pre-combustion coal-based materials at a lower oxidation temperature, (c) roasting the ground pre-combustion coal-based materials at a temperature of between 600° C.-700° C. for a predetermined residence time needed for mineral decomposition, (d) submerging the roasted pre-combustion coal-based materials in a solution of a lixiviant (e) filtering the lixiviant solution to separate residual solids from a pregnant leach solution and (f) recovering and concentrating the valuable elements from the pregnant leach solution.

In at least one of the many possible embodiments of the method, the method includes the additional step of using a lixiviant selected from a group of lixiviants consisting of ammonium sulfate, sulfuric acid, nitric acid, hydrochloric acid, mineral acid, organic acid, carboxyl acid and combinations thereof.

In at least one of the many possible embodiments of the method, the method includes the additional step of using as the pre-combustion coal-based material a material selected from a group consisting of (a) run-of-mine material extracted from a coal seam, (b) associated mineral matter material within and immediately surrounding (roof and floor) a coal seam, (c) waste material generated during the mining process, (d) clean coal products produced in the process of upgrading coal in a processing plant or unit operation, (e) mixed-phase coal material, commonly referred to as 'middlings', (f) coarse coal waste from an active processing facility, (g) fine coal waste from an active processing facility, (h) coarse coal waste from legacy waste storage areas, (i) fine coal waste from a slurry impoundment, slurry cell, slurry pond or other fine waste storage facility and combinations thereof.

In at least one of the many possible embodiments of the method, the recovering and concentrating step includes selectively precipitating the valuable elements. In at least one of the many possible embodiments of the method, the recovering and concentrating step includes solvent extracting the valuable elements. In at least one of the many possible embodiments of the method, the recovering and concentrating step includes selectively precipitating and solvent extracting the valuable elements.

All of these additional steps may be incorporated alone or in combination into the method.

In the following description, there are shown and described several different embodiments of the method of recovering valuable elements from pre-combustion coal-based materials. As it should be realized, the method is capable of other different embodiments and its several details are capable of modification in various, obvious aspects all without departing from the method as set forth and described in the following claims. Accordingly, the drawing and descriptions should be regarded as illustrative in nature and not as restrictive.

BRIEF DESCRIPTION OF THE DRAWING FIGURES

The accompanying drawing figures incorporated herein and forming a part of the patent specification, illustrate several aspects of the method and together with the description serve to explain certain principles thereof.

FIG. 1 is a schematic box diagram of a first possible embodiment of the method.

FIG. 2 is a schematic box diagram of a second possible embodiment of the method.

Figure 4A:
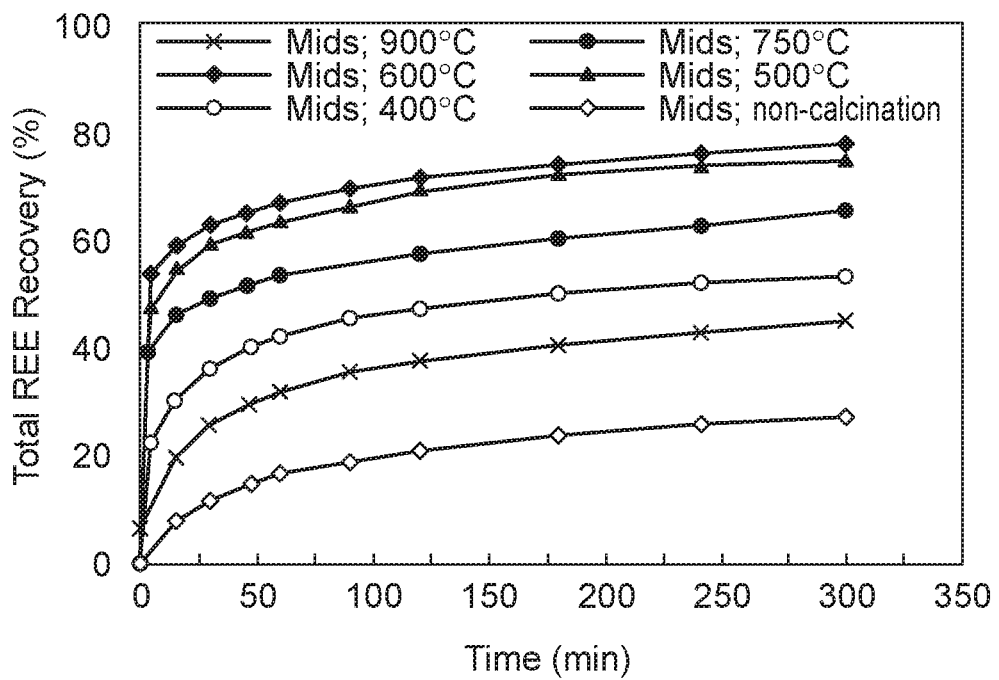
Figure 4B:
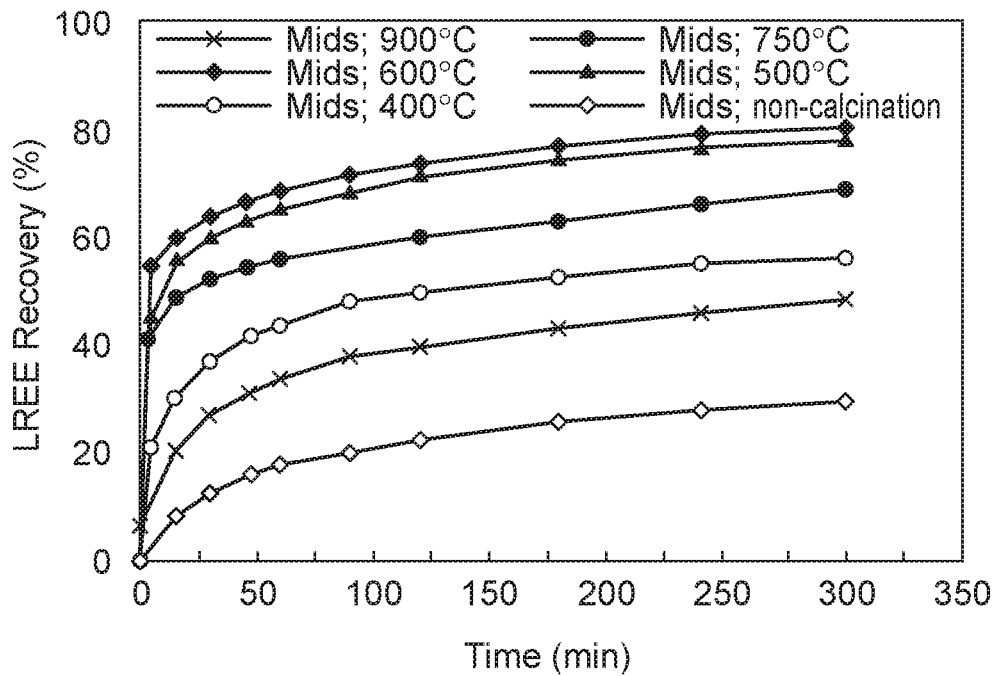
Figure 4C:
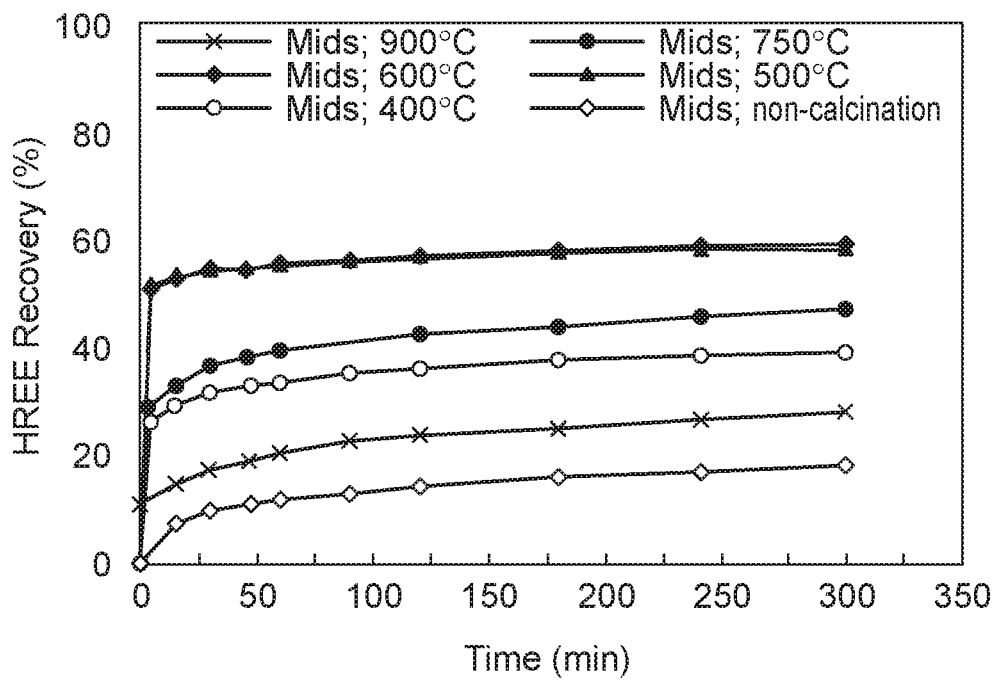

FIGS. 4A-4F illustrate leaching characteristics of total rare earth elements (REEs), light rare earth elements (LREEs) and heavy rare earth elements (HREEs) from the middlings (Mids) and coarse refuse (CR) as a function of reaction time and calcination temperature. FIGS. 4A, 4B and 4C are the total REEs, LREEs and HREEs recovery values, respectively, for the Pocahontas No. 3 middlings sample and 4D, 4E and 4F are likewise for the coarse refuse sample.

Figure 5:
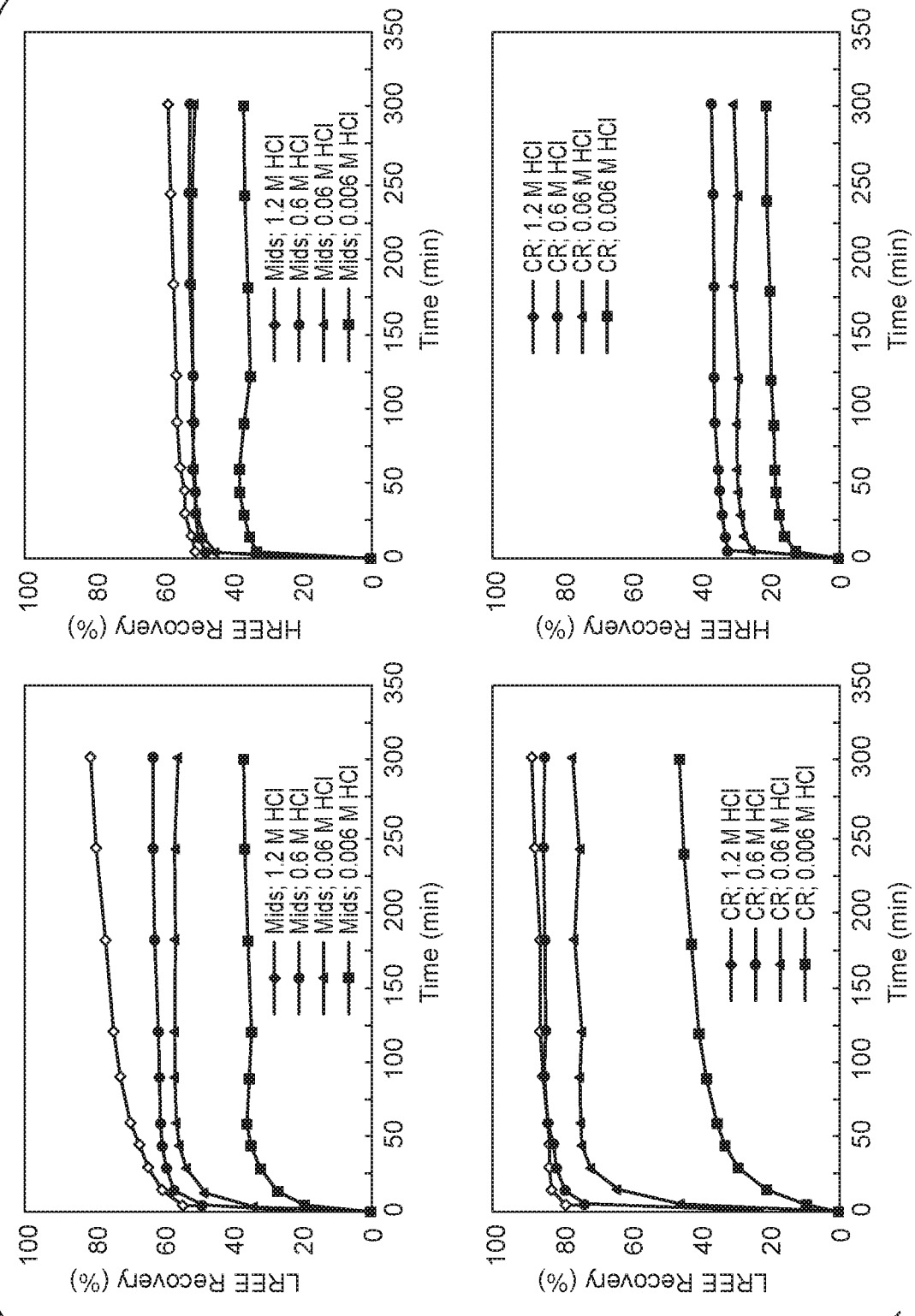
Figure 7A:
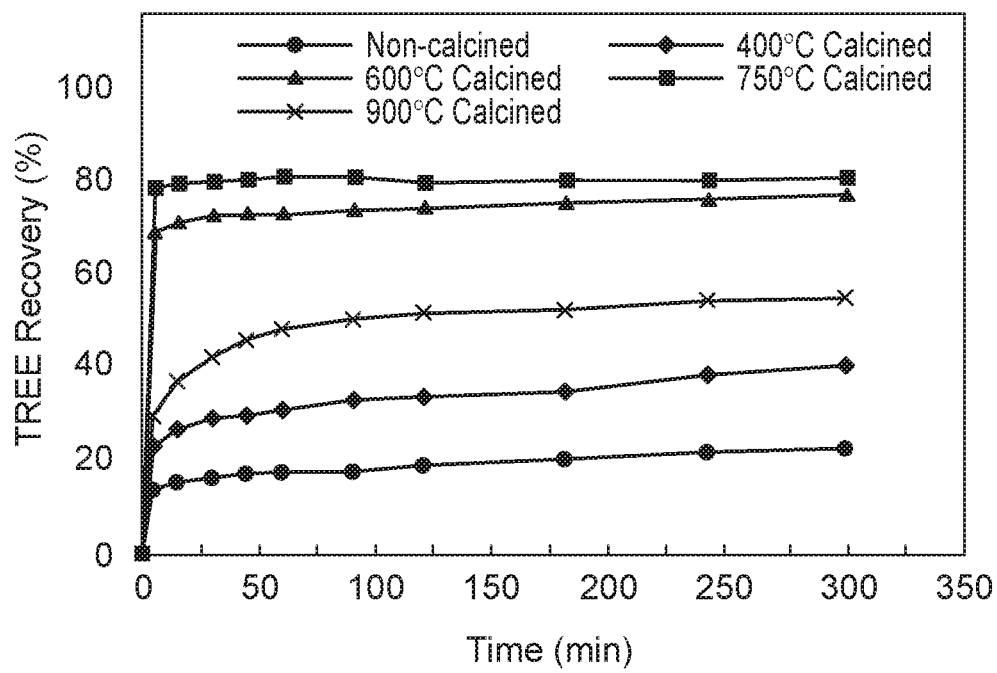
Figure 7B:
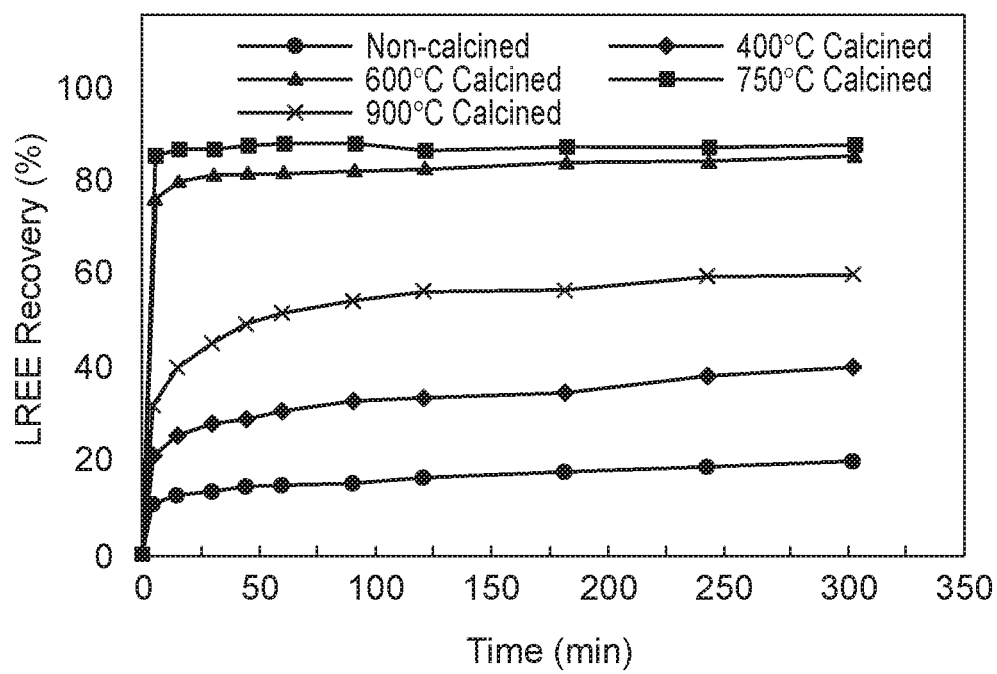
Figure 7C:
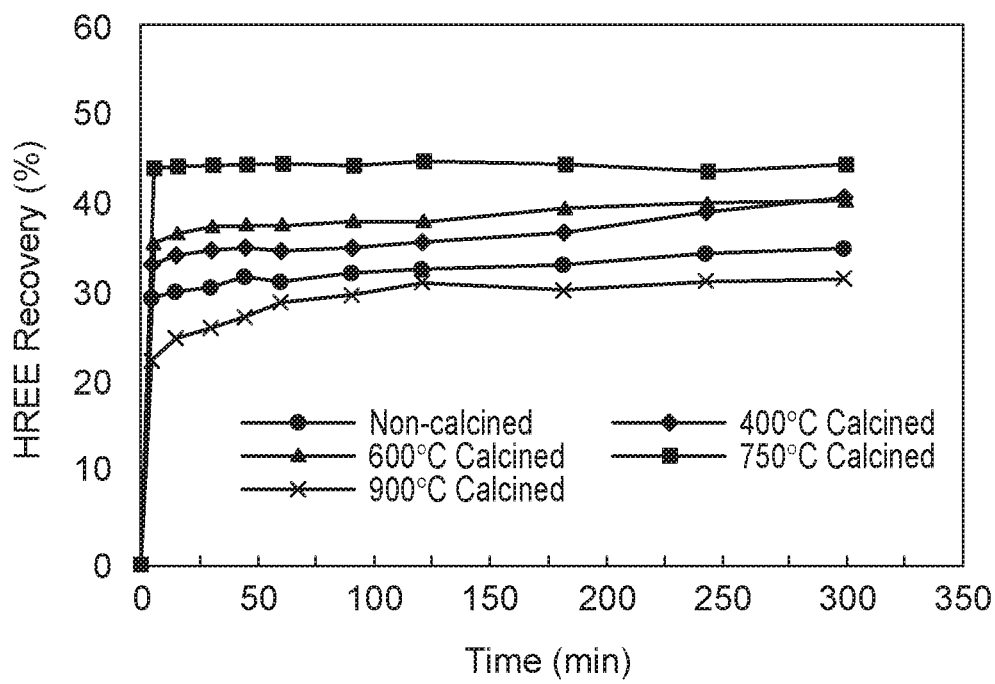
Figure 7D:
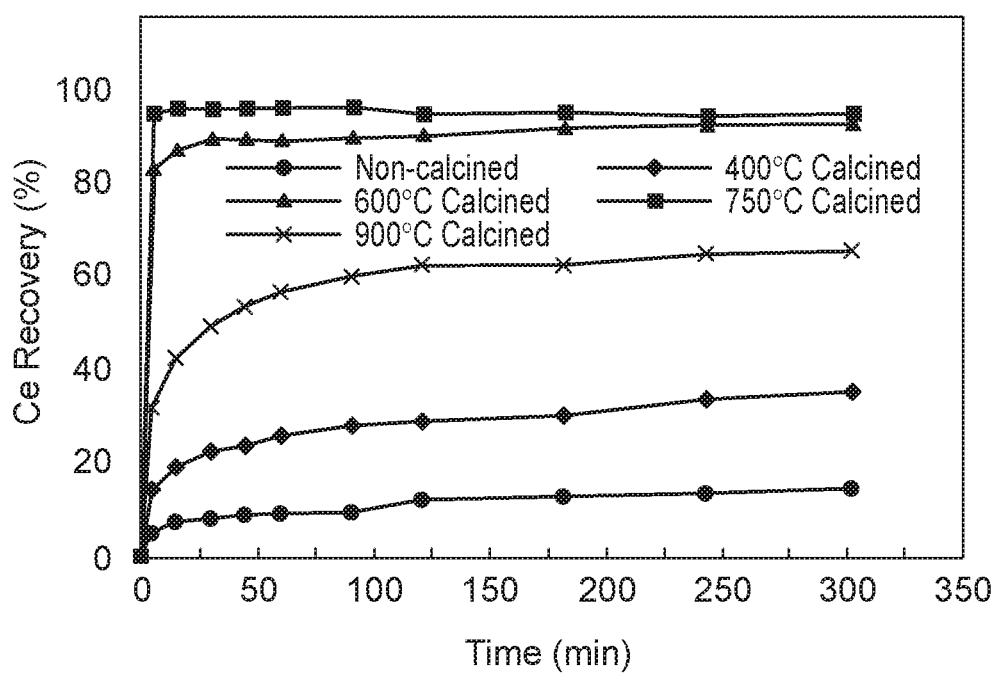
Figure 7E:
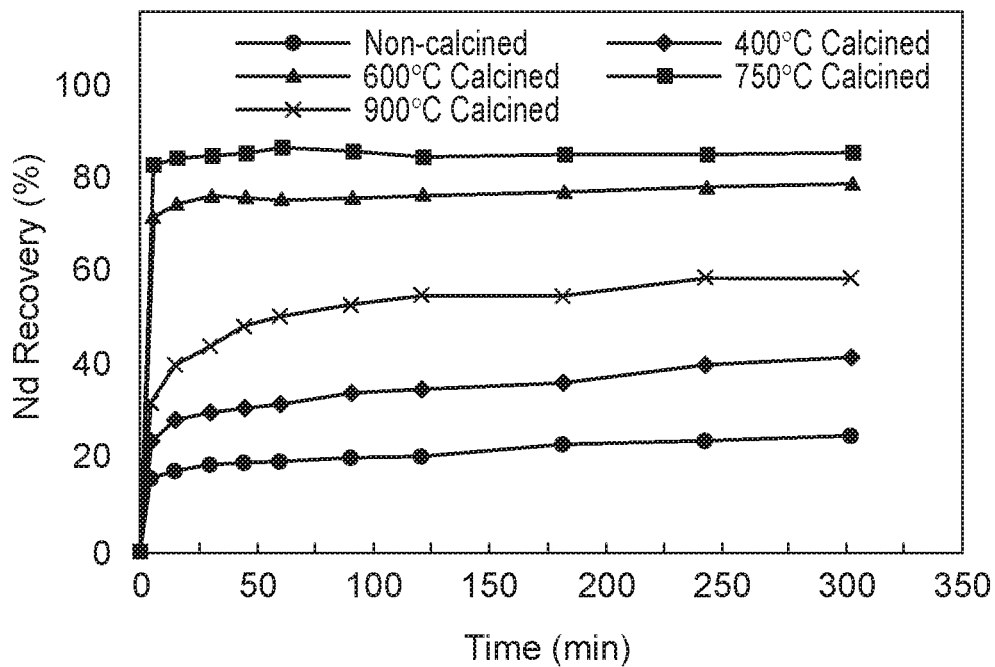
Figure 7F:
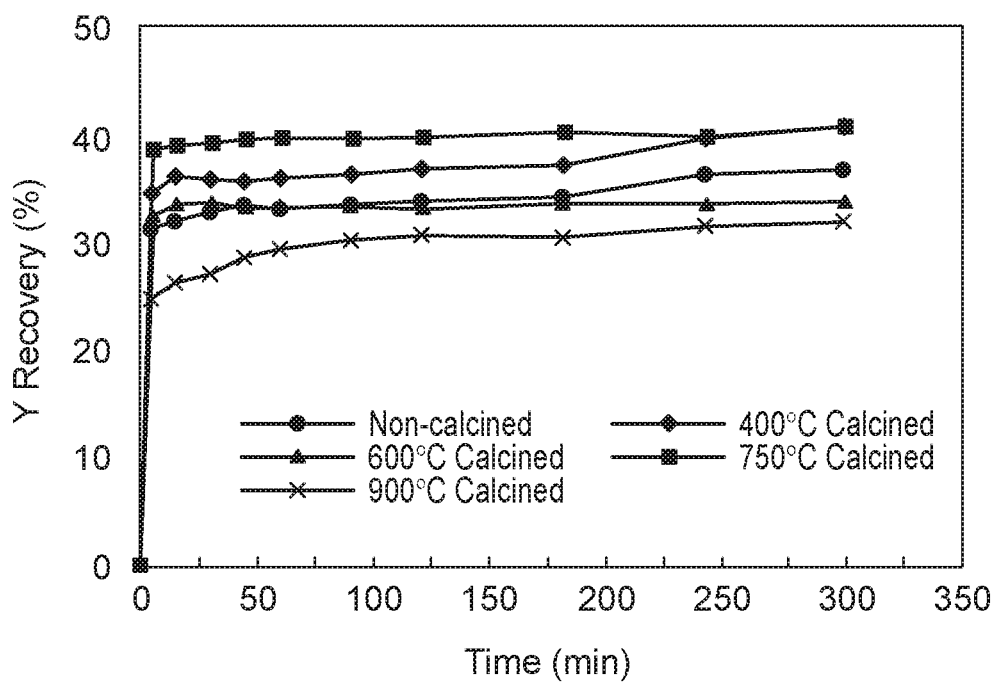
Figure 8A:
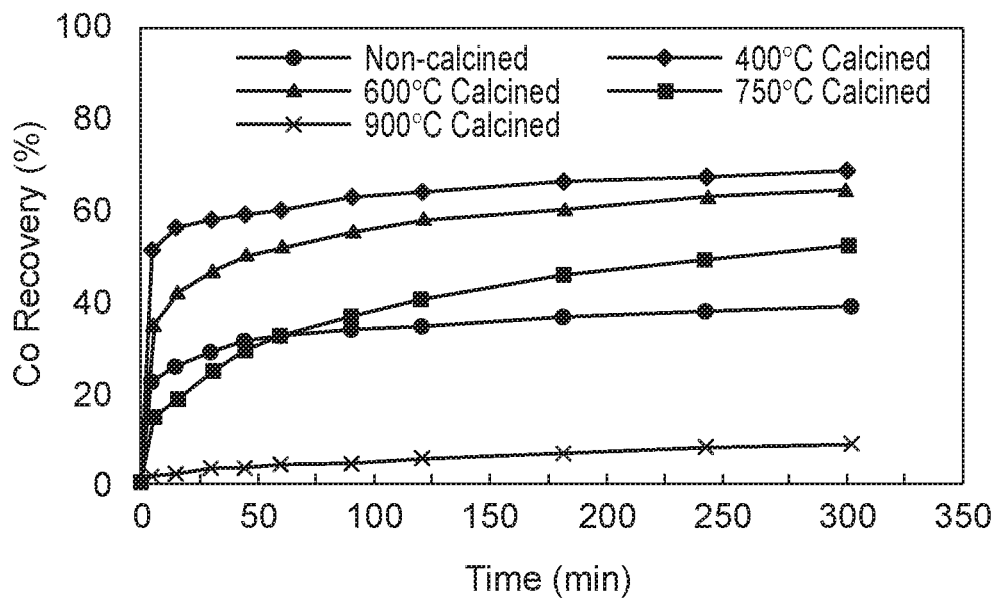
Figure 8B:
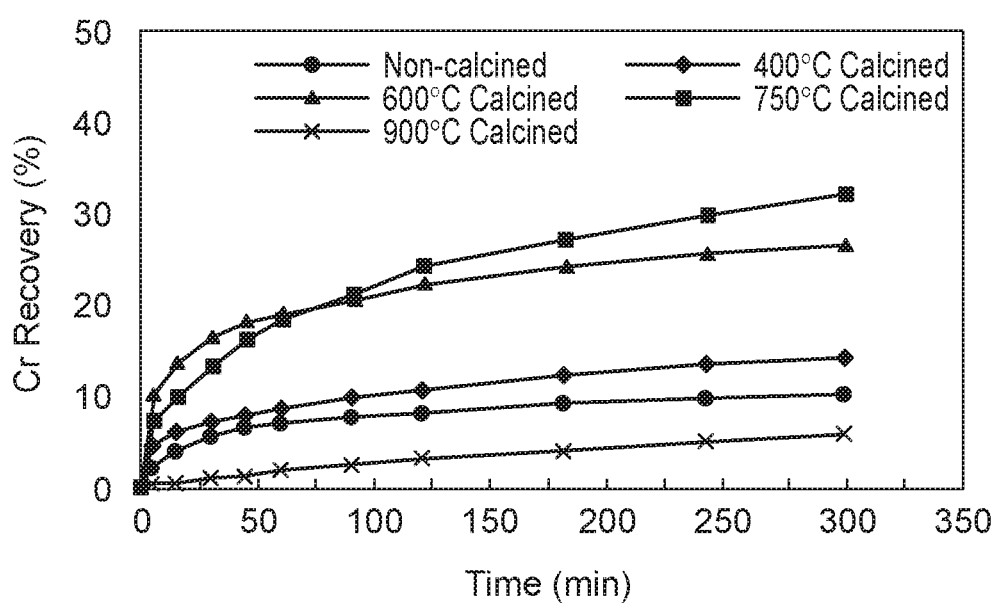
Figure 8C:
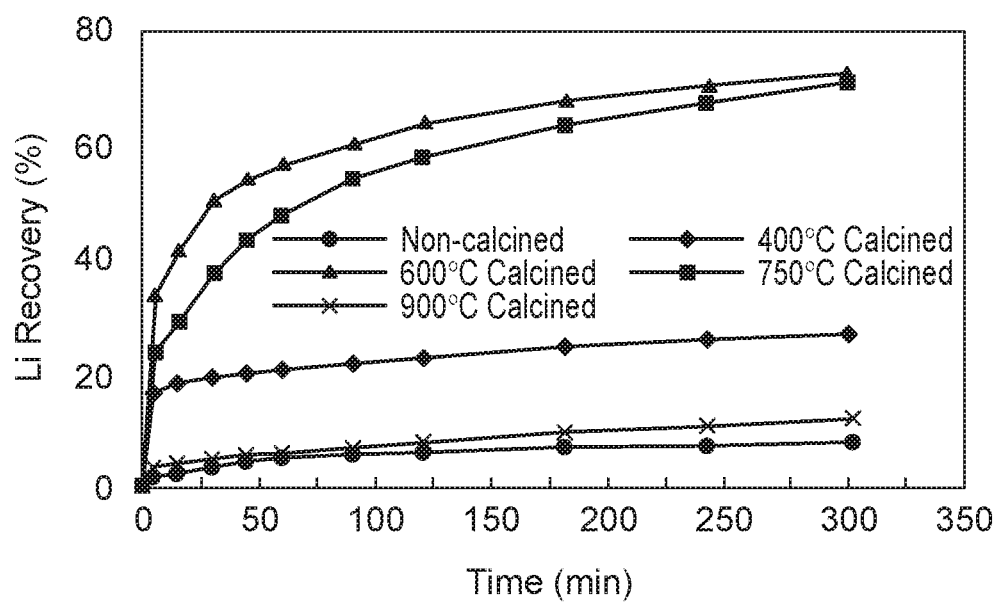
Figure 8D:
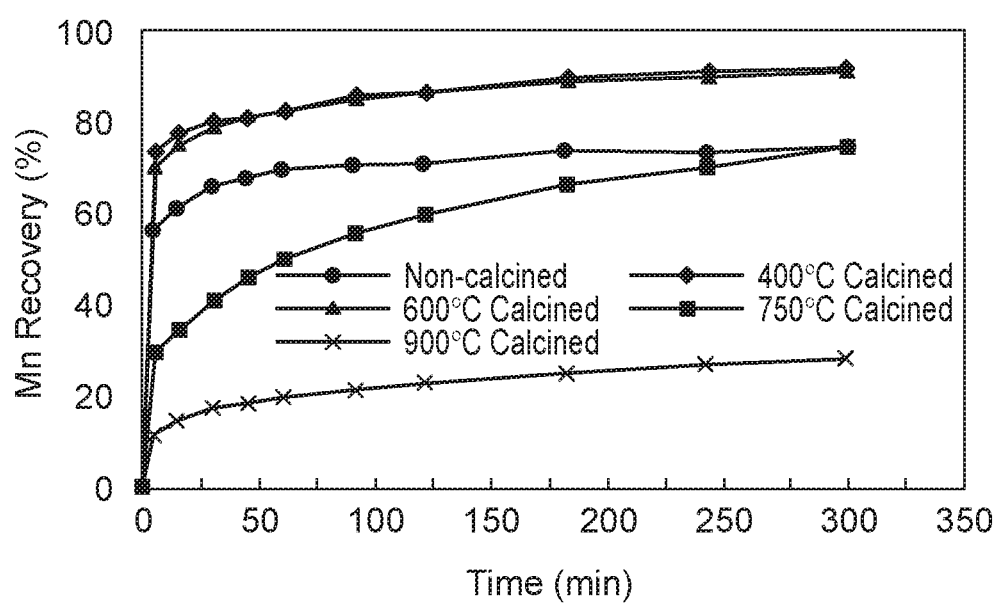
Figure 8E:
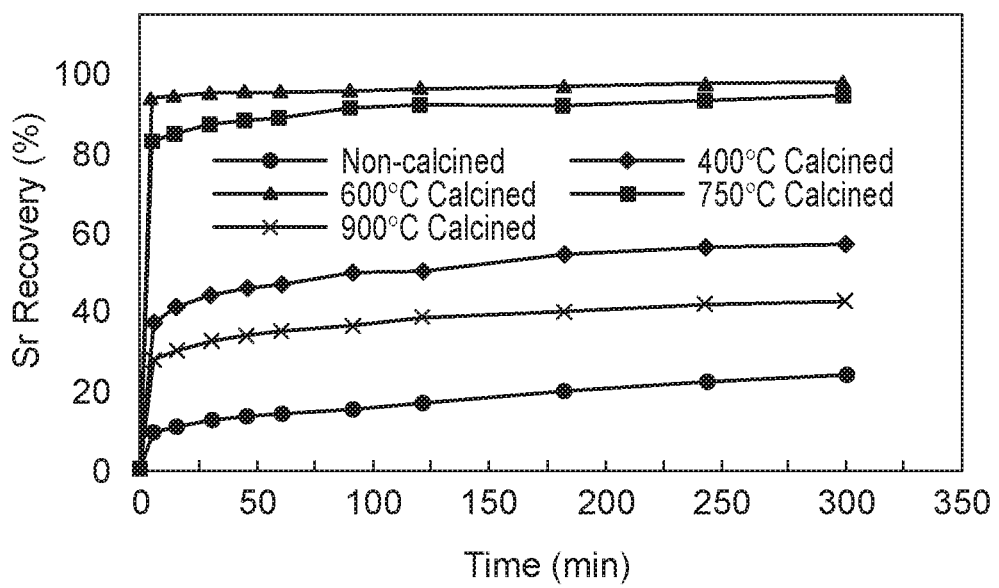
Figure 8F:
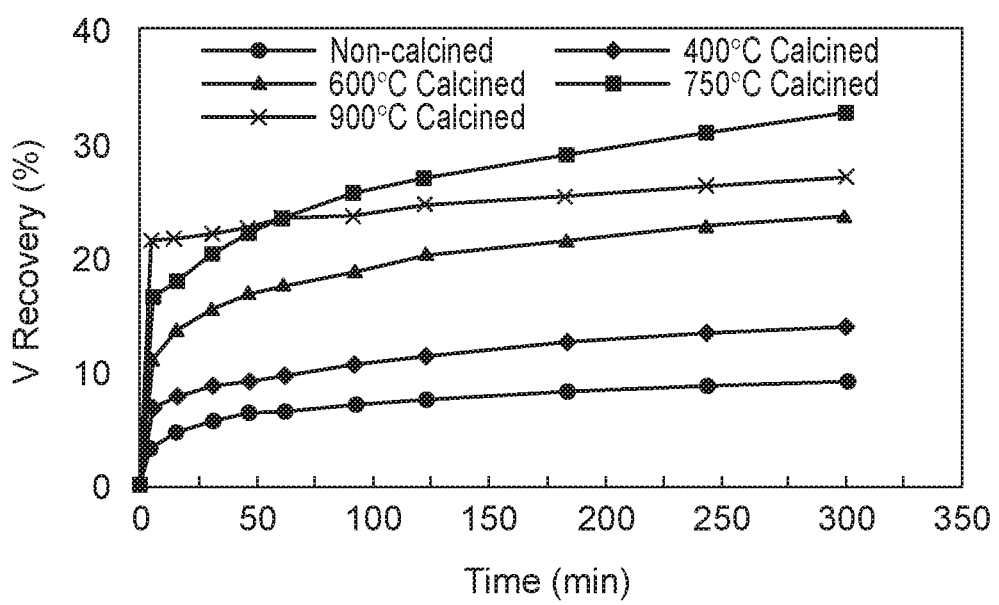

FIG. 5 illustrates the effects of acid concentration on REE recovery from the 600° C. calcined middlings (Mids) and coarse refuse (CR).

FIGS. 6A-6D illustrate scandium leaching characteristics associated with the original (FIG. 6A) middlings (Mids) and (FIG. 6B) coarse refuse (CR) materials using 1.2 M HCl solution and the de-carbonized flotation tailings generated (FIG. 6C) middlings and (FIG. 6D) coarse refuse samples using 0.1M $(NH_4)_2SO_4$.

FIGS. 7A-7F illustrate the effects of calcination temperature on the leaching recoveries of (FIG. 7A) total REEs (TREEs), (FIG. 7B) light REEs (LREE), (FIG. 7C) heavy REEs (HREE), (FIG. 7D) cerium, (FIG. 7E) neodymium and (FIG. 7F) yttrium from the Baker material.

FIGS. 8A-8F illustrate the effects of calcination temperature on the leaching recoveries of other rare metals from the Baker coal seam 2.2 SG sink fraction.

Figure 9:
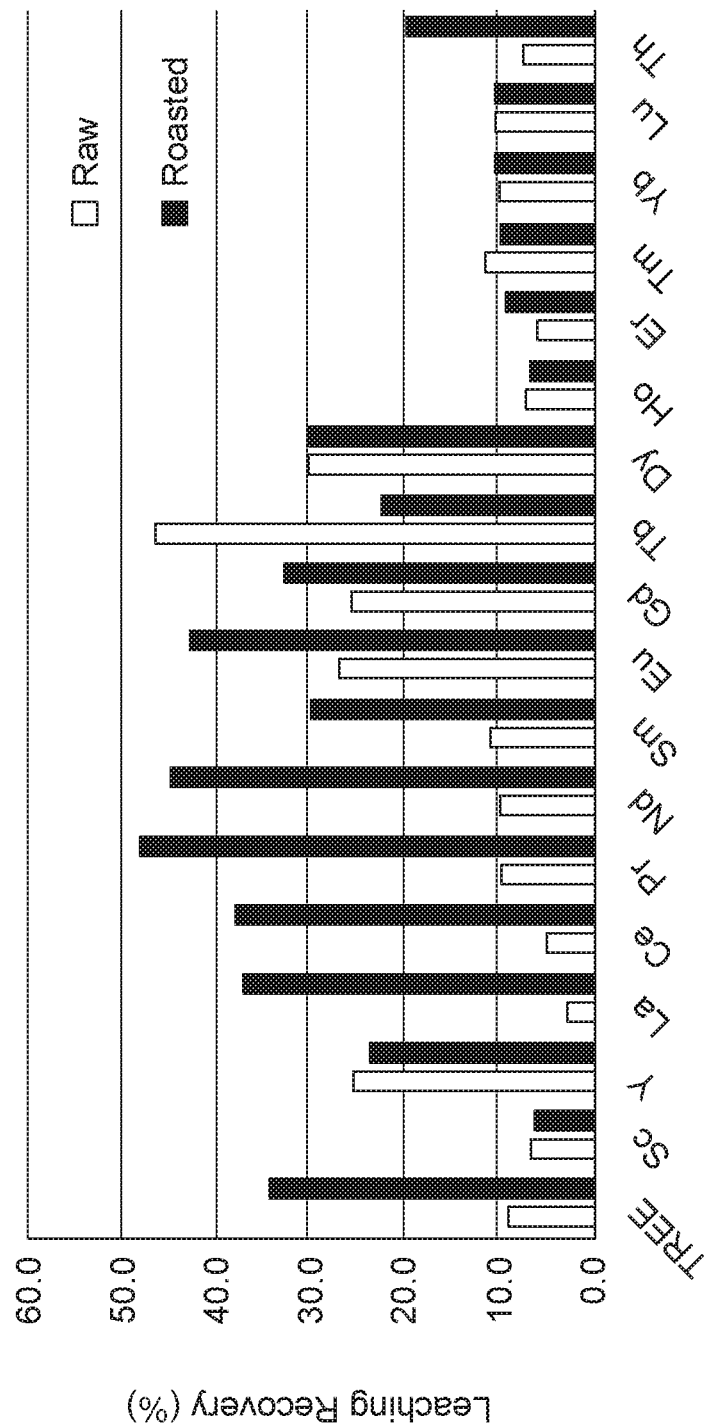

FIG. 9 is a graphic comparison of total and element leach recovery values obtained from Baker coarse refuse material treated by a continuous tube roaster with untreated material.

DETAILED DESCRIPTION

Reference is now made to FIG. 1 which schematically illustrates a first possible embodiment 10 of the method for recovering valuable elements from pre-combustion coal-based materials. That method includes the step 12 of grinding the pre-combustion coal-based materials to a predetermined size. The grinding may be completed by any appropriate crusher or grinding apparatus known in the art to be useful for the purpose of grinding or crushing pre-combustion coal-based materials.

In at least one possible embodiment of the method, the pre-combustion coal-based materials are ground to a top size between approximately 1.0 and 0.15 mm. In at least one possible embodiment of the method, the pre-combustion coal-based materials are ground to a top particle size of about 1 mm.

Following grinding, the now ground pre-combustion coal-based materials are roasted at a temperature of between 600° C.-700° C. for a predetermined residence time needed for mineral decomposition (see step 14 of FIG. 1). The predetermined residence time may vary from as little as several minutes to as long as perhaps two hours depending upon the characteristics of the pre-combustion coal-based material being processed. In at least one possible embodiment of the method, that residence time is between 5 and 120 minutes.

The roasted pre-combustion coal-based material is then submerged in a solution of a lixiviant as set forth in step 16 of FIG. 1. More specifically, the roasted, ground pre-combustion coal-based material is placed into a reactor including the lixiviant. That lixiviant is of a type adapted to extract by leaching the valuable chemicals into a pregnant leach solution (PLS).

Lixiviants useful in the method include, but are not limited to ammonium sulfate sulfuric acid, nitric acid, hydrochloric acid, mineral acid, organic acid, carboxyl acid and combinations thereof.

Next, the method includes the step 18 of filtering the lixiviant solution to separate residual solids from the pregnant leach solution including the valuable elements. This step is then followed by the step 20 of recovering and concentrating the valuable elements from the pregnant leach solution.

The recovering and concentrating step may include (a) selectively precipitating the valuable elements, (b) solvent extracting the valuable elements or (c) selectively precipitating and solvent extracting the valuable elements.

Still more specifically, the method may include the steps of: (a) using at least one of a thickener and a filter press to remove residual solids from the valuable elements held in the pregnant leach solution, (b) using solvent extraction in the concentrating of the valuable elements in the pregnant leach solution and (c) using staged precipitation, selective precipitation or staged and selective precipitation in the precipitating of the valuable elements. The filtering and precipitation of valuable elements is described in further detail in copending U.S. patent application Ser. No. 16/185, 120, filed on Nov. 9, 2018 and entitled "LOW-COST SELECTIVE PRECIPITATION CIRCUIT FOR RECOVERY OF RARE EARTH ELEMENTS FROM ACID LEACHATE OF COAL WASTE," the full disclosure of which is incorporated herein by reference. In some possible embodiments of the invention, the solvent extraction step is eliminated and the pregnant leach solution is only subjected to precipitation of the valuable elements.

Reference is now made to FIG. 2 which schematically illustrates yet another possible embodiment 100 of the method for recovering valuable elements from pre-combustion coal-based materials where those materials, due to their characteristics, would otherwise require calcination temperatures above 700° C. for efficient and effective valuable element recovery. That method includes the step 102 of grinding the pre-combustion coal-based materials to a predetermined size. The grinding may be completed by any appropriate crusher or grinding apparatus known in the art to be useful for the purpose of grinding or crushing pre-combustion coal-based materials.

In at least one possible embodiment of the method illustrated in FIG. 2, the pre-combustion coal-based materials are ground to a size finer than 1 mm to a particle size smaller than a few micrometers. In at least one possible embodiment of the method, the pre-combustion coal-based materials are ground to a top particle size of 1 mm.

Following grinding, a chemical additive is added to the ground pre-combustion coal-based materials to allow decomposition of the ground pre-combustion coal-based materials at a lower oxidation temperature (see step 104 in FIG. 2). Additives useful for this purpose include, but are not necessarily limited to calcium oxide, sodium hydroxide, sodium carbonate, ammonium chloride, mixture of calcium oxide and sodium chloride and combinations thereof. Typically, the ground pre-combustion coal-based materials are mixed with the additive for a period of time of about 1 to 3 minutes.

The now ground and additive-treated pre-combustion coal-based materials are roasted at a temperature of between 600° C.-700° C. for a predetermined residence time needed for mineral decomposition (see step 106 of FIG. 2). The predetermined residence time may vary from as little as several minutes to as long as perhaps two hours depending upon the characteristics of the pre-combustion coal-based material being processed. This lower temperature functions to reduce the cost of the method embodiment 100 of FIG. 2 versus the method embodiment 10 of FIG. 1 by reducing the heat energy input into the process.

The roasted pre-combustion coal-based material is then submerged in a solution of a lixiviant as set forth in step 108 of FIG. 2. More specifically, the roasted, ground pre-combustion coal-based material is placed into a reactor including the lixiviant. That lixiviant is of a type adapted to extract by leaching the valuable chemicals into a pregnant leach solution.

Lixiviants useful in the method include, but are not limited to ammonium sulfate sulfuric acid, nitric acid, hydrochloric acid, mineral acid, organic acid, carboxyl acid and combinations thereof.

Next, the method includes the step 110 of filtering the lixiviant solution to separate residual solids from a pregnant leach solution including the valuable elements. This step is then followed by the step 112 of recovering and concentrating the valuable elements from the pregnant leach solution. The recovering and concentrating step may include selectively precipitating the valuable elements, solvent extracting the valuable elements or selectively precipitating and solvent extracting the valuable elements.

Still more specifically, the method may include the steps of: (a) using at least one of a thickener and a filter press to remove residual solids from the valuable elements held in the pregnant leach solution, (b) using solvent extraction in the concentrating of the valuable elements in the pregnant leach solution and (c) using staged precipitation, selective precipitation or staged and selective precipitation in the precipitating of the valuable elements. The filtering and precipitation of valuable elements is described in further detail in copending U.S. patent application Ser. No. 16/185,120, filed on Nov. 9, 2018 and entitled "LOW-COST SELECTIVE PRECIPITATION CIRCUIT FOR RECOVERY OF RARE EARTH ELEMENTS FROM ACID LEACHATE OF COAL WASTE," the full disclosure of which is incorporated herein by reference. In some possible embodiments of the invention, the solvent extraction step is eliminated and the pregnant leach solution is only subjected to precipitation of the valuable elements.

EXPERIMENTAL

Example No. 1

Figure 3:
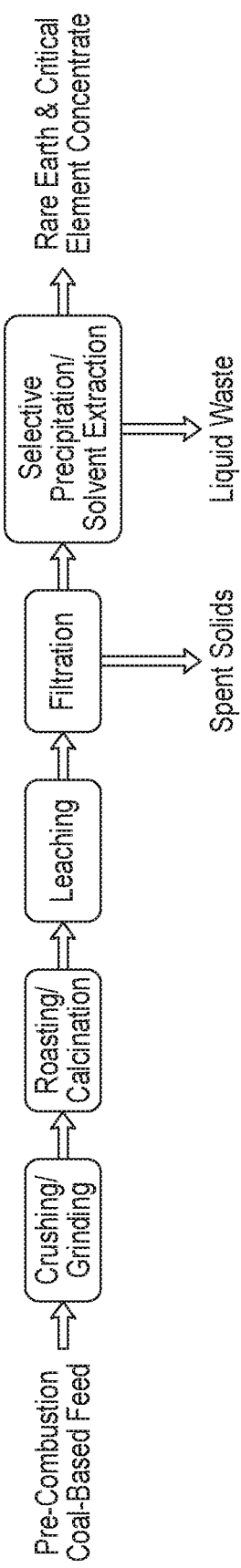
FIG. 3 is a schematic block diagram showing the processing steps utilizing high temperature oxidation pretreatment to enhance the recovery of valuable elements.

Representative middling and coarse refuse samples were collected from existing process streams of a preparation plant located near Beckley, W. Va., USA, which processed coal from the Pocahontas No. 3 seam. The coarse refuse sample was further processed in the lab using a dense medium bath comprised of ultrafine magnetite and water to obtain a 2.2 SG float fraction. Both the middlings and the 2.2 SG float fraction of the coarse refuse were dried at room temperature and pulverized to achieve a top particle size of 0.18 mm. A representative sample was directly leached in laboratory experiments using a 1.2 M HCl solution at a solids concentration of 1% by weight with a solution temperature of 75° C. Additional representative samples were roasted in a laboratory muffle furnace over a range of temperatures followed by leaching using the aforementioned conditions. The process followed the process steps depicted in FIG. 3.

Figure 4D:
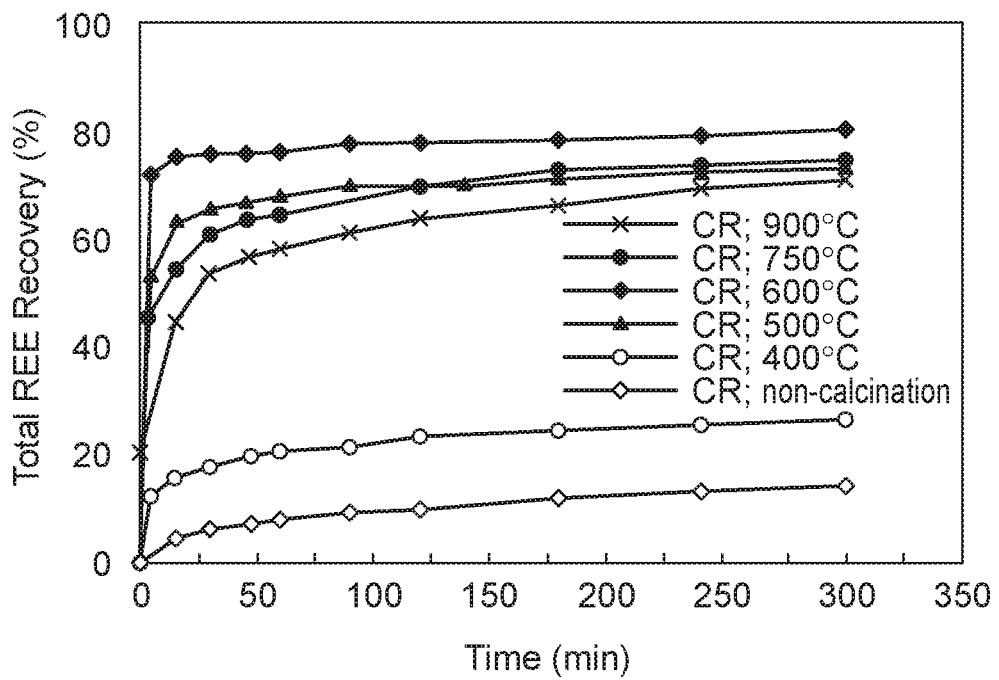
Figure 4E:
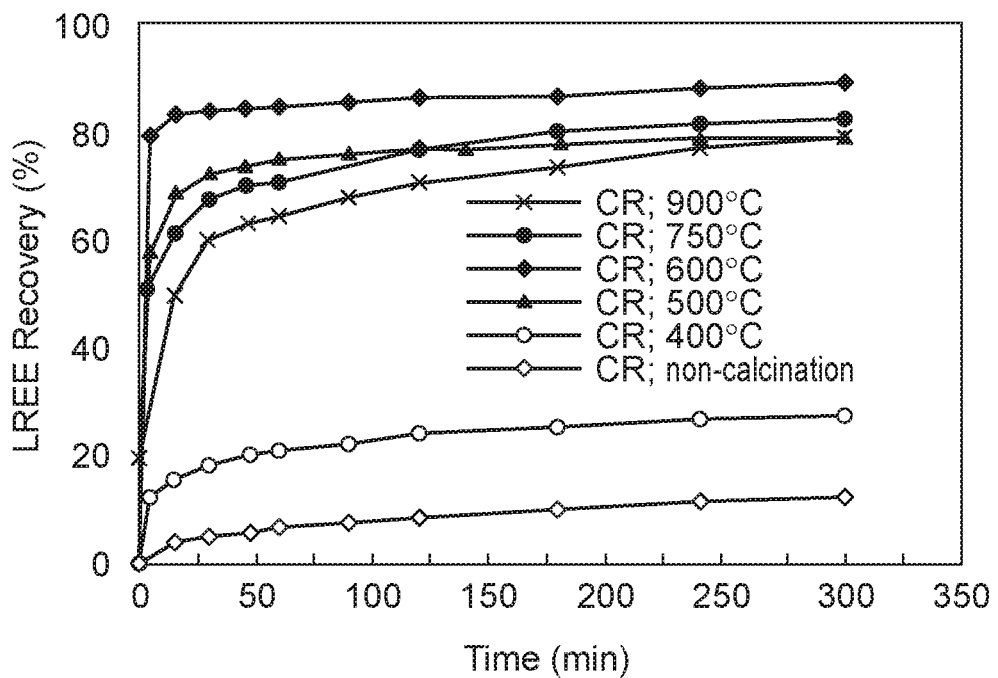
Figure 4F:
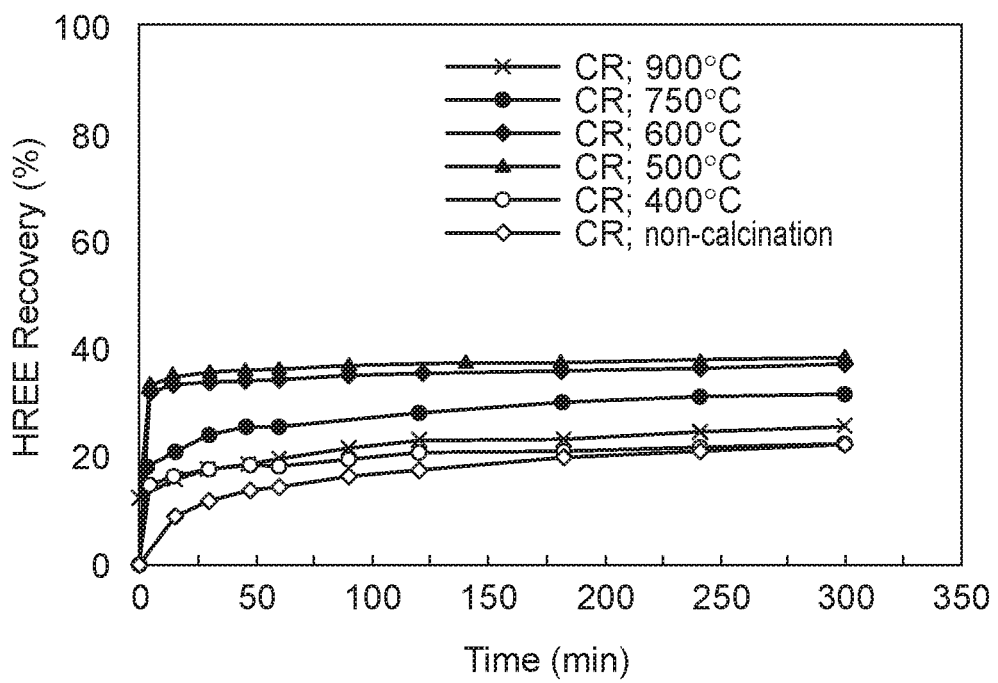

Leaching results obtained under the standard conditions for the non-calcined middling and coarse refuse materials indicated relatively poor potential for recovery. Total REE recovery for the middlings sample was less than 25% after 300 min of leaching and the recovery from the coarse reject material was even less with a value around 15% as shown in FIGS. 4A and 4D. The recovery of HREEs was 5 to 10 absolute percentage points lower for middlings material but about 5 percentage points higher for the coarse refuse, which marked a significant difference between the two sources (FIGS. 2C and 2F). Calcination at 600° C. for two hours significantly improved the REE leaching recovery from both sample sources with values around 80% for total REEs and LREEs. The leaching recovery of HREEs from the middlings material was greatly enhanced and approached a value of 55% within the first five minutes of treatment. The improvement was less but still significant for the HREEs associated with the coarse refuse.

Tests were conducted over a range in HCl concentrations from 0.006M to 1.2M on calcined samples prepared using a temperature of 600° C. As shown in FIG. 5, there was minimal effect on leaching recovery when reducing the acid concentration to 0.6M for both the calcined coarse refuse and middling material. An order of magnitude reduction to 0.06M acid concentration resulted in a slight decrease in HREE and LREE recovery within the range of 6-8 percentage points. Another order of magnitude reduction in HCl concentration to 0.006 M provided a significant drop in the recovery of LREEs especially for the coarse refuse material where a 30-percentage point decrease was measured. The reduction in HREE recovery was in the range of 9 to 14 percentage points.

Scandium (Sc) is presented separately due to the fact that its ionic radius is much smaller than that of REEs, which results in different mineralogical and leaching characteristics. FIG. 6 shows the leaching behavior of Sc under different calcination and leaching conditions. For both the middlings and coarse refuse, maximum Sc recovery was obtained using 600° C. calcination. The leaching kinetic curves can be divided into two parts: a relatively fast kinetic rate period within the first 5 min followed by very slow leaching kinetics. As such, Sc leaching behavior is similar to HREEs. After 5 hours of reaction with 1.2 M HCl, 54% and 29% of Sc were leached from the 600° C. calcined middling and coarse refuse samples, respectively. In comparison, Sc recovery from samples not treated by high temperature oxidation was around 8% and 12%, respectively.

Example No. 2

To evaluate the benefits of high temperature oxidation on the leaching recovery of critical elements other than rare earth elements, a representative plant feed sample was collected from a coal preparation plant located in western Kentucky USA that processed the Baker (West Kentucky No. 13) seam coal. The coal is classified as high volatile, bituminous coal having a total sulfur content of around 5% of which approximately 50% is pyrite. The sample was air-dried and the material coarser than 10 mm was obtained by dry sieving. The oversize fraction was density fractionized using a dense medium bath of 2.2 specific gravity (SG). After separation, the resultant sink material (i.e., material denser than 2.2 times the density of water) was air-dried at room temperature and pulverized to a top particle size of 0.18 mm. Tests involving high temperature oxidation in a muffle furnace followed by acid leaching were performed in the same manner as described in Example No. 1.

Leaching recoveries of total, light, and heavy REEs as well as individual REEs (Ce, Nd, and Y) are shown in FIGS. 7A-7F. The total REE and light REE recoveries were significantly increased when the material was calcined under a temperature of around 600° C. For example, nearly 90% of LREEs were extracted from the 600° C. calcined material after 300 min of reaction, whereas only 21% of LREEs were extracted from the non-calcined material under the same conditions. In addition, leaching kinetics of the REEs were also improved after calcination. As show in FIG. 7B, when the material was calcined under 600° C., 86% of LREEs were leached within the first 5 min and recovery gains by prolonged leaching were minimal (around 4%). Unlike the LREEs, a relatively small increase (from 32% to 45%) in HREE recovery was obtained by calcining at 750° C. for two hours. Overall, calcination imposed positive impacts on REE recovery for the Baker material when using acid leaching as the extraction process.

The effects of high temperature oxidation on the leaching recoveries of other rare metals including Co, Cr, Li, Mn, Sr, and V are shown in FIGS. 8A-8F. The highest recoveries of all the elements except Co occurred when the material was calcined in 600-750° C. which coincided with the optimum calcination temperature of the REEs. Therefore, an opportunity was created for a co-recovery of the REEs and the other rare metals from the material. In addition, as shown in FIGS. 8A-8F, leaching recoveries of Co, Li, Mn, and Sr reached as high as 65%, 70%, 90%, and 95% when the material was calcined at 600° C. for 2 hours.

Example No. 3

Continuous roasting tests were performed in a 15-cm diameter rotary tube furnace. The tests were performed on 75×12 mm coarse reject material produced for an operating coal preparation plant treating coal from the Baker seam in western Kentucky. The material was crushed and ground to a top particle size of around 1 mm prior to being fed to the continuous roaster. The material was fed to the roaster continuously at a rate of 4.5 kg/hr (10 lbs/hr) using a screw feeder. The retention time in the heat zone of the tube furnace was around 5 minutes. The inner tube temperature was controlled to achieve a constant value of 650° C. Representative samples of the feed and product streams were collected and subjected to acid leach tests in a 1M $H_2SO_4$ at a solid:liquid ratio of 1:5 at room temperature for 15 min.

FIG. 9 shows a comparison of the element-by-element leach recovery values achieved from treated and untreated Baker coarse refuse material using the continuous tube roaster. The leaching characteristics of the light rare earth elements (La, Ce, Pr, Nd, Sm, Eu and Gd) improved significantly by the treatment through the rotary furnace while the leaching behavior of the heavy rare earth elements remained relatively unchanged. Overall, total rare earth recovery increased from around 9% to 34% as a result of the high-temperature oxidation treatment.

In summary, a number of benefits and advantages result from the proposed method set forth herein. The method alters the mode of occurrence of the valuable elements comprised in coal from a form that is difficult to recover to a state that is more readily recovered using mild acid/lixiviant solutions.

The method also advantageously reduces the amount of the lixiviant needed to achieve a given recovery value for the valuable elements. Still further, the method increases the recovery of valuable elements when using a given lixiviant/acid dosage. This reduces the costs of the method.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A method for recovering valuable elements from pre-combustion coal-based materials, comprising:
   grinding the pre-combustion coal-based materials;
   roasting the ground pre-combustion coal-based materials at a temperature of between 600° C.-700° C. for mineral decomposition;
   submerging the roasted pre-combustion coal-based materials in a solution of a lixiviant;
   filtering the lixiviant solution to separate residual solids from a pregnant leach solution; and
   recovering and concentrating the valuable elements from the pregnant leach solution.

2. The method of claim 1, including using a lixiviant selected from the group of lixiviants consisting of ammonium sulfate, sulfuric acid, nitric acid, hydrochloric acid, mineral acid, organic acid, carboxyl acid and combinations thereof.

3. The method of claim 2, including using as the pre-combustion coal-based material a material selected from the group consisting of (a) run-of-mine material extracted from a coal seam, (b) associated mineral matter material within and immediately surrounding a coal seam, (c) waste material generated during a mining process, (d) clean coal products produced in a process of upgrading coal in a processing plant or unit operation, (e) mixed-phase coal material, (f) coarse coal waste from an active processing facility, (g) fine coal waste from an active processing facility, (h) coarse coal waste from legacy waste storage areas, (i) fine coal waste from a slurry impoundment, slurry cell, slurry pond or storage facility and combinations thereof.

4. The method of claim 3, wherein the recovering and concentrating includes selectively precipitating the valuable elements.

5. The method of claim 3, wherein the recovering and concentrating includes solvent extracting the valuable elements.

6. The method of claim 3, wherein the recovering and concentrating includes selectively precipitating and solvent extracting the valuable elements.

7. The method of claim 1, including using as the precombustion coal-based material a material selected from the group consisting of (a) run-of-mine material extracted from a coal seam, (b) associated mineral matter material within and immediately surrounding a coal seam, (c) waste material generated during a mining process, (d) clean coal products produced in a process of upgrading coal in a processing plant or unit operation, (e) mixed-phase coal material, (f) coarse coal waste from an active processing facility, (g) fine coal waste from an active processing facility, (h) coarse coal waste from legacy waste storage areas, (i) fine coal waste from a slurry impoundment, slurry cell, slurry pond or storage facility and combinations thereof.

8. The method of claim 1, wherein the recovering and concentrating includes selectively precipitating the valuable elements.

9. The method of claim 1, wherein the recovering and concentrating includes solvent extracting the valuable elements.

10. The method of claim 1, wherein the recovering and concentrating includes selectively precipitating and solvent extracting the valuable elements.

11. A method for recovering valuable elements from pre-combustion coal-based materials, comprising:
grinding the pre-combustion coal-based materials;
adding a chemical additive to the ground pre-combustion coal-based materials to decompose the ground pre-combustion coal-based materials;
roasting the ground pre-combustion coal-based materials at a temperature of between 600° C.-700° C. for a predetermined residence time needed for mineral decomposition;
submerging the roasted pre-combustion coal-based materials in a solution of a lixiviant;
filtering the lixiviant solution to separate residual solids from a pregnant leach solution; and
recovering and concentrating the valuable elements from the pregnant leach solution.

12. The method of claim 11, including using a lixiviant selected from the group of lixiviants consisting of ammonium sulfate, sulfuric acid, nitric acid, hydrochloric acid, mineral acid, organic acid, carboxyl acid and combinations thereof.

13. The method of claim 12, including using as the pre-combustion coal-based material a material selected from a group consisting of (a) run-of-mine material extracted from a coal seam, (b) associated mineral matter material within and immediately surrounding a coal seam, (c) waste material generated during a mining process, (d) clean coal products produced in a process of upgrading coal in a processing plant or unit operation, (e) mixed-phase coal material, (f) coarse coal waste from an active processing facility, (g) fine coal waste from an active processing facility, (h) coarse coal waste from legacy waste storage areas, (i) fine coal waste from a slurry impoundment, slurry cell, slurry pond or storage facility and combinations thereof.

14. The method of claim 13, wherein the recovering and concentrating includes selectively precipitating the valuable elements.

15. The method of claim 13, wherein the recovering and concentrating includes solvent extracting the valuable elements.

16. The method of claim 13, wherein the recovering and concentrating includes selectively precipitating and solvent extracting the valuable elements.

17. The method of claim 11, including using as the pre-combustion coal-based material a material selected from the group consisting of (a) run-of-mine material extracted from a coal seam, (b) associated mineral matter material within and immediately surrounding a coal seam, (c) waste material generated during a mining process, (d) clean coal products produced in a process of upgrading coal in a processing plant or unit operation, (e) mixed-phase coal material, (f) coarse coal waste from an active processing facility, (g) fine coal waste from an active processing facility, (h) coarse coal waste from legacy waste storage areas, (i) fine coal waste from a slurry impoundment, slurry cell, slurry pond or storage facility and combinations thereof.

18. The method of claim 11, wherein the recovering and concentrating includes selectively precipitating the valuable elements.

19. The method of claim 11, wherein the recovering and concentrating includes solvent extracting the valuable elements.

20. The method of claim 11, wherein the recovering and concentrating includes selectively precipitating and solvent extracting the valuable elements.

* * * * *